(No Model.)
W. H. ROSS.
JET CONDENSER.
No. 458,540.
Patented Aug. 25, 1891.
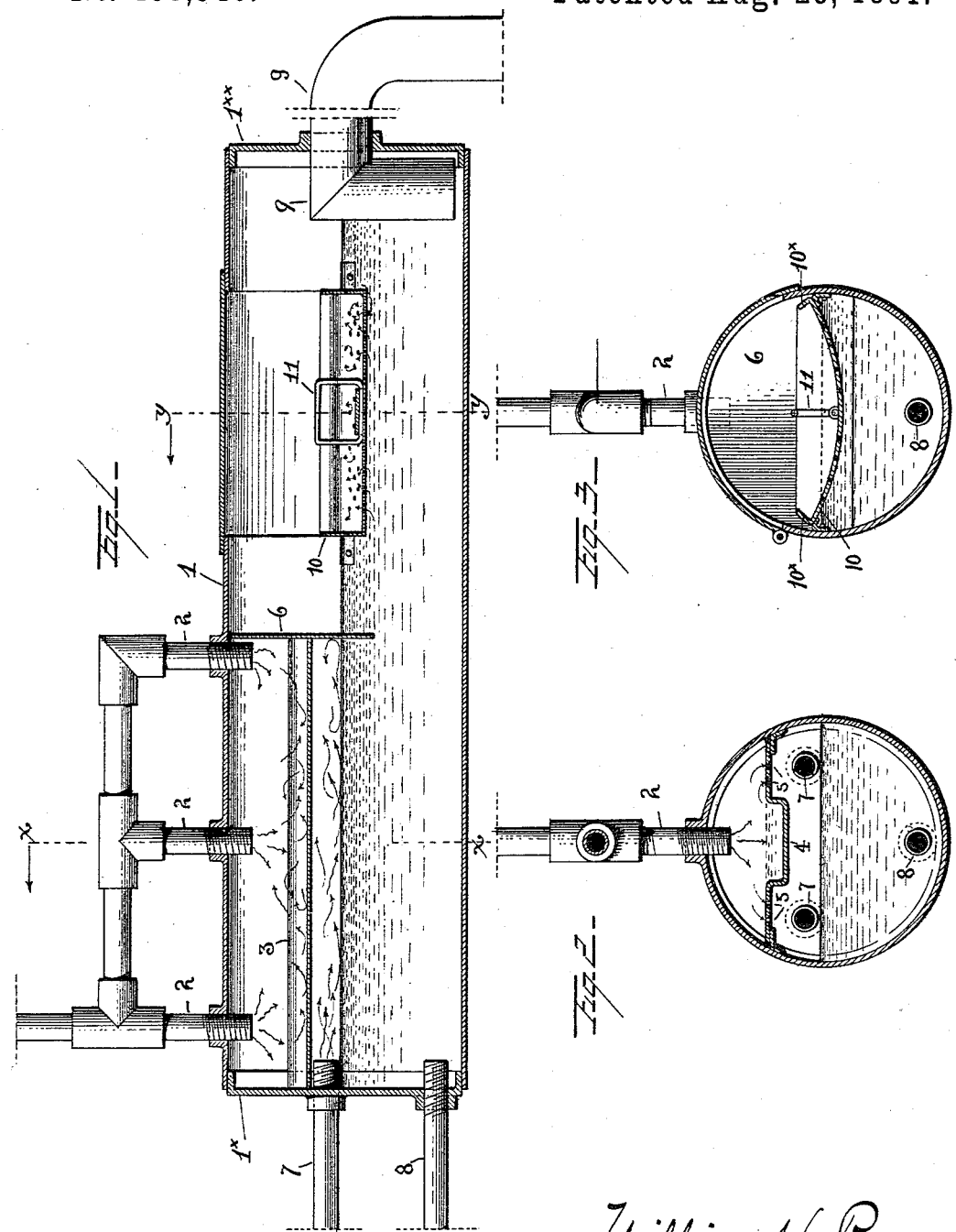
Witnesses:
William H. Ross
Inventor:
By John Jolley Jr
his Attorney

United States Patent Office.

WILLIAM H. ROSS, OF CAMDEN, NEW JERSEY, ASSIGNOR OF ONE-HALF TO WILLIAM BRYANT, OF PHILADELPHIA, PENNSYLVANIA.

JET-CONDENSER.

SPECIFICATION forming part of Letters Patent No. 458,540, dated August 25, 1891.

Application filed April 21, 1891. Serial No. 389,856. (No model.)

*To all whom it may concern:*

Be it known that I, WILLIAM H. ROSS, a citizen of the United States, residing in the city and county of Camden, in the State of New Jersey, have invented certain new and useful Improvements in Jet-Condensers, of which the following is a specification, due reference being had to the accompanying drawings, which illustrate my invention.

My invention relates to the class of condensers employed in connection with steam-boilers and the like for condensing the exhaust-steam therefrom, and has for its object the rapid, noiseless, effective, and complete condensation of such exhaust-steam in an open space, cheapness in construction, simplicity in operation, and connected means for saving the oil that passes through the condenser apparatus and heretofore lost.

Referring to the drawings, which illustrate my invention, Figure 1 is a central longitudinal view of a condenser embodying my invention. Fig. 2 is a vertical sectional view of the same, taken on the line $x\,x$, Fig. 1, looking in the direction indicated by the arrows and showing the sprinkling-shelf, spray-pipes, hot-feed and exhaust-steam-supply pipes; and Fig. 3 is a vertical sectional view taken on the line $y\,y$, Fig. 1, looking in the direction indicated by the arrows, and showing the steam-check plate and oil-trap.

In the drawings the several parts are indicated by numerals, and 1 represents the condenser-casing, which is preferably cylindrical in form and having end heads $1^\times$ $1^{\times\times}$. One or more spray-pipes 2, having a connected source of water-supply, enter the casing 1 at the top. Within the casing, adjacent to the spray-pipes, is located what I term a "sprinkling-shelf" 3. This shelf is rigidly fixed within the casing in a suitable manner, and consists of a plate having a central depression or trough 4, as to its longitudinal axis, and a series of perforations 5 each side of the trough for purposes presently explained. A dash or steam-check plate 6 forms part of or is mounted on or attached to the sprinkling-shelf 3 at one end for a purpose that will presently appear. This plate in outline is preferably a three-quarter disk, and of such size that its periphery meets the casing at top and sides, while its lower end extends below the water-line of the condenser. Exhaust-steam-supply pipe or pipes 7 and hot-feed pipe 8 lead into the condenser-chamber through the head $1^\times$, and the chamber at its opposite end or head $1^{\times\times}$ is provided with an outlet-pipe 9.

Having now described the particular parts of my device, its operation is as follows: The valve of the spray-pipes 2 being opened, a supply of water is fed into the condenser-chamber, falling first onto the trough 4 of the sprinkling-shelf 3 and, overflowing, it escapes to the bottom of the chamber through the series of perforations 5 on each side of the trough 4, and continues until the water finds its common level or water-line, at which time the lower end of the dash or steam-check plate 6 is below the flush level of the water and the exhaust-steam-supply pipes 7 are at or slightly above said water-line, a clear space existing between the water-surface and the bottom of the sprinkling-shelf, and, as will be understood by those skilled in the art to which my invention appertains, exhaust-steam is caused to enter the condenser immediately above the surface of the water and is sprayed or sprinkled and condensed by the cold water escaping in its downward passage through the perforated portion of the sprinkling-shelf. The steam, in its travel over the surface of the water in the condenser, encounters the dash-plate 6, which acts as a diaphragm or check, prevents its escape and confines it within the open space of the condenser existing between the surface of the water and the sprinkling-shelf until it is completely condensed in the manner described, and, as will be further understood, sufficient vacuum is formed to prevent back-pressure. The hot-feed pipe 8 connects with the condenser a proper distance above the mud-line, and the outlet-pipe 9 at the opposite end of the condenser preferably extends nearly to the bottom thereof and below the mud-line. The condenser may be easily cleaned in the well-known manner of turning the hot feed into the chamber and forcing the sediment through the outlet-pipe.

A condenser constructed in accordance with my invention is noiseless in its operation, effects complete condensation of steam in an open space, and has no back-pressure.

I desire it understood that I do not restrict myself to the exact construction of parts as shown in my drawings, but may vary the same in any manner to better carry out the principle of my invention without departing from the true scope thereof.

As is also well known in connection with condensers, considerable oil passes through its outlet-pipe and is lost. To prevent this waste I have devised an oil-trap, which consists of a basin or tray 10, having a perforated bottom, and preferably a handle 11 for lifting and carrying the same. This trap I conveniently locate within the condenser near its outlet-pipe, and so support it, preferably removable, relatively to the contained body of water as to be partially submerged, so that when the oil reaches the trap it will pass through its perforations and be retained against further escape by its side walls 10×, all in a manner conveniently accomplished, and as will be fully understood by a reference made to the accompanying drawings, suitable means being provided—for instance, an opening in the cylinder—whereby the trap and its contents may be removed and the oil deposited in a ready receptacle for future use.

I claim—

1. A steam-condenser consisting of a suitable casing or vessel provided with exhaust-steam-supply pipe, hot-feed pipe, outlet-pipe, and spray-pipes, as described, in combination with a perforated sprinkling-shelf mounted within the same above the water-line and below the spray-pipes, and a steam-check plate at one end of said sprinkling-shelf extending below the water-line and its periphery above the water-line in contact with the casing, whereby steam is admitted into the space in the condenser above the water-line formed by the sprinkling-shelf and the lower part of the steam-check plate and condensed by being sprayed or sprinkled with cold water escaping downwardly through said perforated sprinkling-shelf, substantially as described.

2. In a steam-condenser, a sprinkling-shelf mounted within the condenser above its water-line to form a steam-space below it and consisting of a plate provided with a trough or depression as to its longitudinal axis, and a series of perforations each side of said trough, in combination with a source of water-supply entering the condenser above said sprinkling-shelf, as described, and for the purposes set forth.

3. In a steam-condenser, an oil-trap consisting of a basin or tray having a perforated bottom and means for supporting said trap in a partially-submerged position within the condenser, whereby oil reaching said trap will pass through the perforations in its bottom and be retained therein by the side walls thereof, as set forth.

4. In a steam-condenser, an oil-trap consisting of a basin or tray having a perforated bottom, means for removably supporting said trap in a partially-submerged position within the condenser, whereby oil reaching said trap will pass through the perforations in its bottom and be retained therein by the side walls thereof, and a handle or the like to said trap for lifting the same, as and for the purposes set forth.

In testimony whereof I have hereunto signed my name this 10th day of February, A. D. 1891.

WM. H. ROSS.

In presence of—
JOHN JOLLEY, Jr.,
W. ALEX. ROBINSON.